United States Patent Office 2,810,060
Patented Oct. 15, 1957

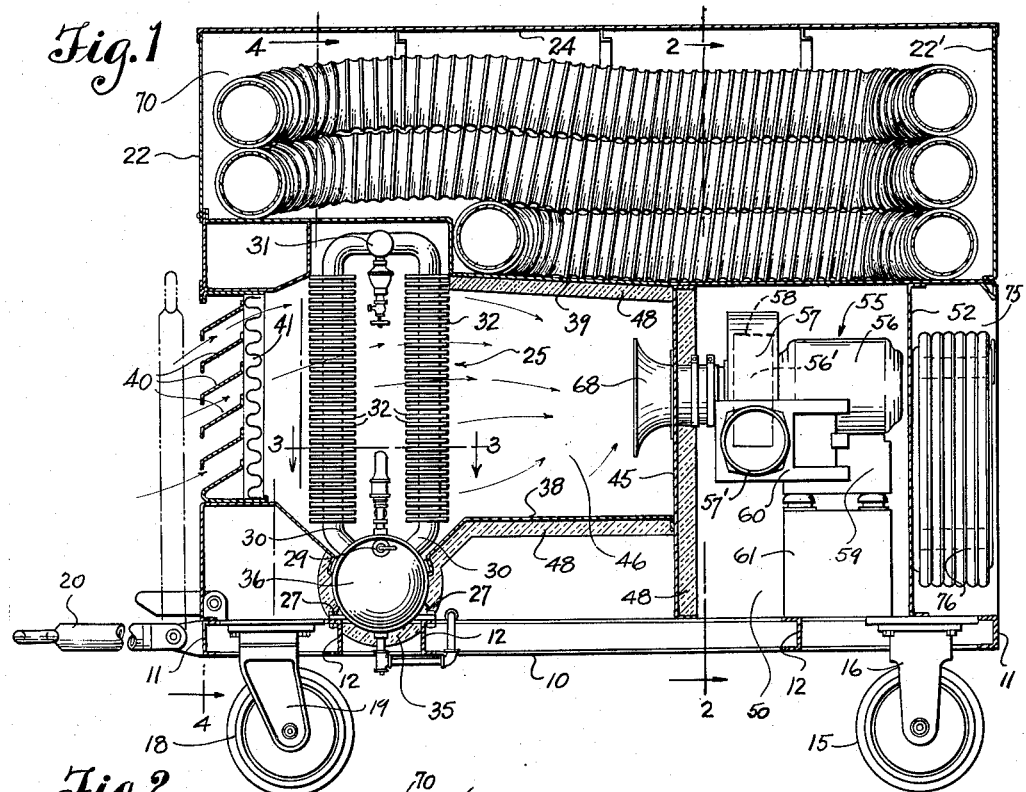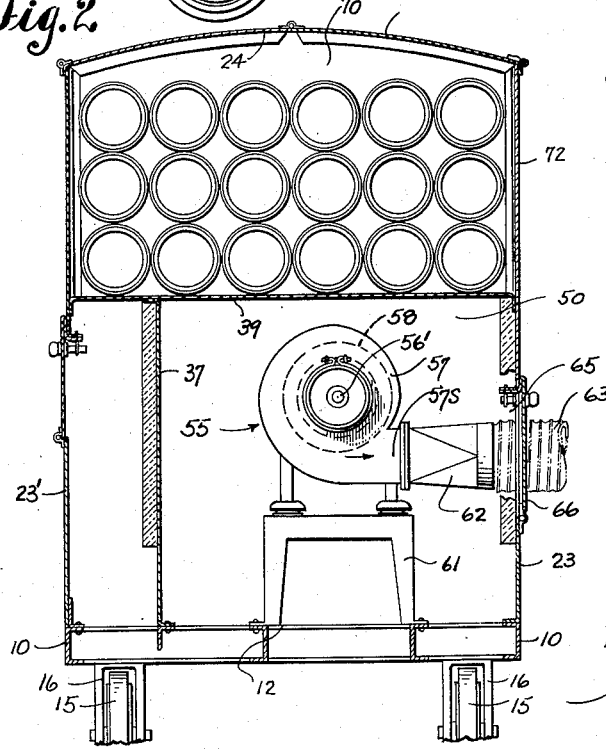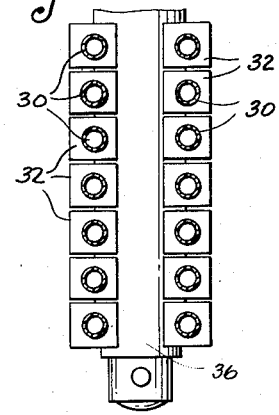

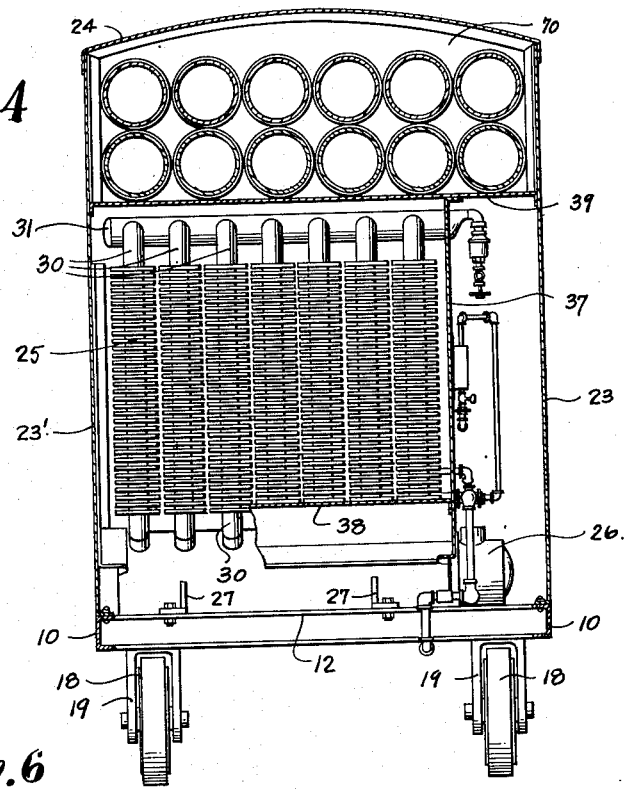
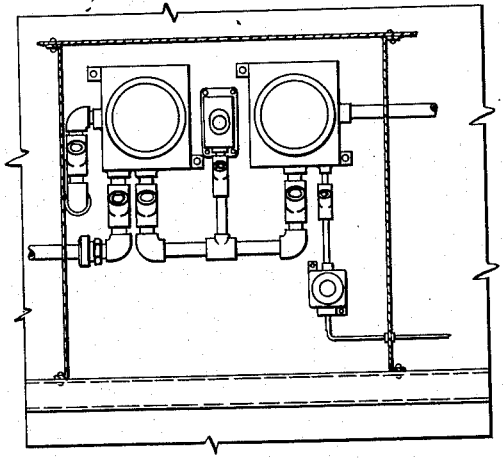
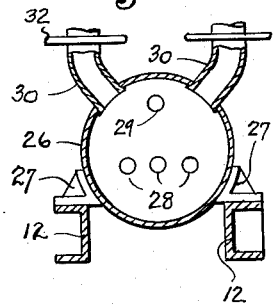
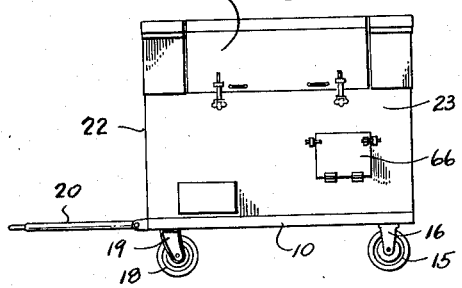

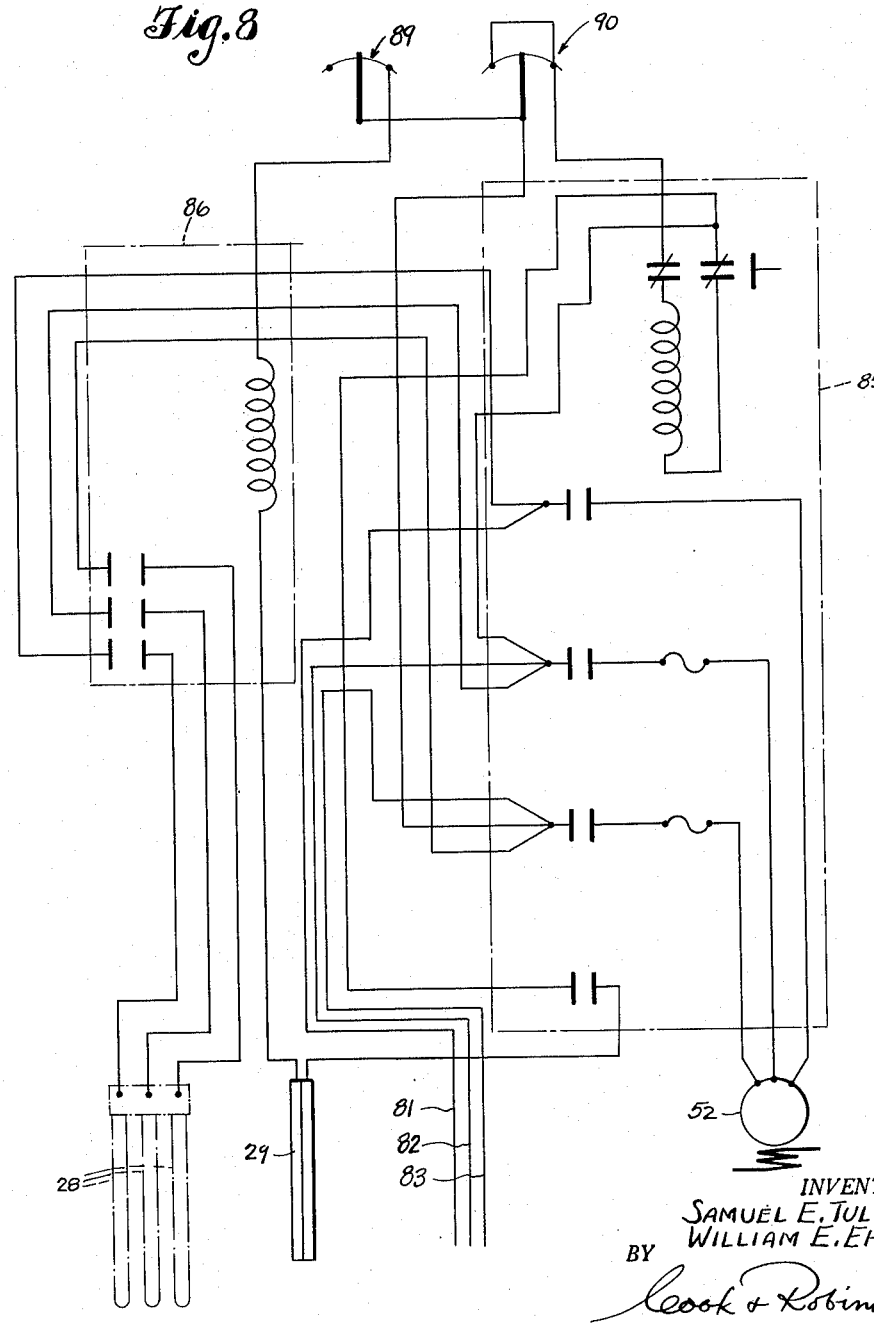

2,810,060
MOBILE HEATING AND DRYING UNIT

Samuel E. Tullis and William E. Ehlers, Jr., Seattle, Wash.

Application September 12, 1955, Serial No. 533,864

4 Claims. (Cl. 219—39)

This invention relates to mobile heating and drying units and has reference more particularly to mobile units of those types including air heaters in combination with fans or blowers and ducts whereby the heated air can be forcibly delivered to specific points or areas of use.

It is the principal object of this invention to provide an improved form of high capacity heating and drying unit of the character above stated, wherein the air moving element comprises a suction-blower type fan that is operable to draw air through a heat exchanger for heating thereby, and to then discharge the heated air through a flexible duct to a selected place of use.

It is a further object of this invention to provide a compact, practical, and effective mobilized unit, capable of being readily towed from place to place, and quickly put into operation; the unit being equipped with an electrically heated boiler, and an electric motor for driving the blower fan, and being adapted to carry with it a substantial amount of flexible duct or tubing to be used as required for the conduction of heated air from the blower to a selected place of use, and also to house therein a substantial length of cable through which electric current can be delivered from a source of supply to the blower driving motor and to the electric heating elements of the boiler.

Still further objects of the invention reside in the details of construction of various parts, and in their combination and mode of operation in use, as will hereinafter be fully described.

In accomplishing the above mentioned and other objects of the invention, we have provided the improved details of construction, the preferred forms of which are illustrated in the accompanying drawings, wherein:

Fig. 1 is a central, longitudinal section of the present unit taken in a vertical plane.

Fig. 2 is a vertical cross-section of the unit, taken on the line 2—2 in Fig. 1.

Fig. 3 is a sectional detail, taken on the line 3—3 in Fig. 1, through a portion of the heat exchanger.

Fig. 4 is a cross-section of the present unit taken on line 4—4 in Fig. 1.

Fig. 5 is a cross-section of the heat exchanger boiler.

Fig. 6 is an elevation of the electrical control board.

Fig. 7 is a side view of the unit, shown at a reduced scale.

Fig. 8 is a wiring diagram for the electrical apparatus of the unit.

The present unit comprises a horizontal base structure, or chassis, comprising longitudinal opposite side beams 10—10, opposite end beams 11—11 and a plurality of intermediate crossbeams 12, the latter being located and spaced as best shown in Fig. 1. Each of the members 10, 11 and 12 is preferably of channel iron, and all are welded or otherwise suitably joined together to provide a rigid base frame structure.

The base structure is supported, at what will be referred to as its rear end, by a pair of laterally spaced wheels 15—15 mounted by yokes 16 that are bolted or otherwise fixed to the frame structure. At its forward end, the base structure is supported by a pair of laterally spaced wheels 18—18 with caster mountings as designated by numeral 19. A tongue 20 is pivotally hinged to the crossbeam 11 at the front end of the base frame to serve as the means for towing the unit from place to place.

Erected upon the base frame structure is a box-like, enclosing housing in which the heat exchanger, blower and other elements of the unit, presently to be described, are located. This housing comprises vertical and parallel front and rear end walls 22 and 22'; vertical and parallel opposite sidewalls 23 and 23' and a top 24, this being upwardly arched across the body as shown in Figs. 2 and 4.

Supported within the forward end portion of the housing is the heat exchanger; this being designated in its entirety by reference numeral 25. Below the heat exchanger is a heater 26 comprising a closed, cylindrical boiler that is disposed horizontally and transversely of the base frame structure and, as shown best in Fig. 1, is equipped at opposite sides for its support with brackets 27 which rest upon and are bolted to two closely arranged crossbeams 12. The boiler 26 is equipped for its heating with a plurality of electrical immersion heaters 28 and these operate automatically under control of a thermostat 29 to maintain a predetermined temperature in the boiler.

The heat exchanger 25 comprises a multiplicity of vertical water and steam tubes 30 with lower ends opening into the top of the boiler 26 along opposite sides thereof as seen in Fig. 5. At their upper ends, the tubes of the rows are turned inwardly or toward each other and open into a header 31. Along their vertical portions, the tubes 30 are fitted with closely spaced radiation disks or fins 32, and it is between these tubes and fins that air is drawn for heating.

It will be understood by reference to Fig. 1 that the boiler 26 is encased across bottom and sides by an insulating material, designated at 35. It is also to be noted that the boiler elements are contained within and across an enclosed passage that extends in a direction lengthwise of the unit, and which is defined by the housing sidewall 23', a longitudinal partition wall 37, a horizontal bottom wall 38 and horizontal top wall 39. This passage opens, as seen in Fig. 1, through the front end wall of the housing and is there equipped with a series of vertically spaced louvers 40. Immediately within the louvers an air filter 41 is supported. At its inner end, the passage is closed off by a vertical crosswall 45, located rearwardly of the heat exchanger thus to provide a sort of plenum chamber 46 between the end wall 45 and boiler. This plenum chamber has its enclosing walls well insulated by suitable material such as designated by numeral 48 in Fig. 1.

Formed within the rear end portion of the main housing, is a chamber 50; this being located between the cross wall 45 and a farther rearward cross wall 52 as seen in Fig. 1, and the sidewalls 23 and 37 as seen in Fig. 2.

Located in the compartment 50 is the suction blower fan unit designated in its entirety by reference numeral 55. This unit comprises electrical motor 56 and blower 57. The blower housing is of the involute form shown in Fig. 2 and it encloses a fan 58 which is mounted on the extended end portion of the driveshaft 56' of the electric motor. The blower housing is supported from the motor base 59 by means of a frame structure designated at 60 in Fig. 1, and the motor base in turn is mounted upon a table form structure 61 that is fixed to crossbeams 12 of the base frame structure of the vehicle.

The blower housing has its discharge spouts 57s directed laterally, as seen in Fig. 2, and it is fitted with a hose or duct adapter 62, to which a flexible air delivery duct or tube, as at 63, may be attached. To provide for the connection of the duct to the adapter, the adjacent sidewall 23 of the housing is provided with an opening 65, and a door, as at 66, is hinged to the housing wall to close over said opening when the duct is not attached.

The intake of the blower housing is located at the forward side. Extended forwardly from this opening, through the partition wall 45 and opening into the plenum chamber 46, is a tube 68 with a flared, funnel-like forward end portion. When the blower is in operation, it operates to draw heated air from the plenum chamber 46 and forcibly discharge it through the duct 63 to a point of use. As air is drawn from the plenum chamber, outside air is sucked in through the louver equipped opening, and filter 41, and then drawn through the heat exchanger 25 and, in passing, picks up heat from the tubes 30 and fins 32.

The heated air can be discharged to any selected place of use within the range afforded by the duct 63.

As a convenience, the upper portion of the enclosing housing is formed between the top wall 24 and the horizontal partition wall 39 with a compartment 70 in which a plurality of sections or lengths of flexible duct may be contained; it being anticipated that these sections can be easily joined for use in any number required. Access to this compartment is through an opening along one side of the top portion of the housing, this opening being equipped with a hinged door 72.

It is also noted in Fig. 1 that at its rear end, the housing has a rearwardly opening recess 75 immediately back of the partition wall 52, in which a supply of electric cable 76 is contained; there being suitable supports provided on which the cable can be wound, and from which it can be extended as required for connection of the electrical equipment with a source of supply of electric current.

In Fig. 8, a wiring diagram for the electrical equipment has been shown.

In this view power supply lines are designated by the numerals 81, 82 and 83 which connect through the various devices of a magnetic contactor, designated generally by numeral 85, with the motor 52. Also, the three lines similarly connect through a magnetic contactor 86 with elements of the immersion heaters 28 for operation under control of the thermostat 29. The blower motor operates under control of a switch designated generally by numeral 89 and the heater is under control of a selector switch 90.

Units of the character above described have many and varied uses. For example, for temporary compartment heating; for the thawing of utilities; for evaporation of highly volatile and explosive liquid; for paint drying; for engine warm up in extremely cold weather; for ventilation in explosive atmosphere; for rapid defrosting of large refrigerators and for spot heating and ventilating of working areas in normally cold plants.

Having thus described our invention, what we claim as new there and desire to secure by Letters Patent is:

1. A heating and drying unit of the character described comprising a mobile frame structure mounting a housing thereon; said housing having a passage formed therein that opens from the housing at one end for air intake and which has a closing wall at its other end, a heat exchanger located in said passage near its open end and setting off a plenum chamber between it and said closing wall, and a motor driven suction blower unit mounted outside said housing, having an air intake tube extended therefrom into said plenum chamber and having a discharge spout directed from the unit.

2. A heating and drying unit of the character described comprising a mobilized frame structure, a housing mounted thereon formed with an air passage open at one end to the outside of said housing and closed at its inner end, a heat exchanger disposed in said passage near its open end and setting off a plenum chamber between it and the closed end of said passage, air filtering means disposed across the open end of said passage and a suction blower unit mounted on the vehicle beyond the closed end of said air passage and having an intake extended therefrom into said plenum chamber, and having a discharge spout extended from the unit.

3. A unit as recited in claim 2 wherein said heat exchanger comprises a steam generating boiler disposed within the base of said housing and a plurality of finned water and steam tubes extended upwardly therefrom and through said passage for contact by air that is intaken under influence of said suction blower unit.

4. A mobile heating and driving unit of the character described comprising a base frame structure equipped with wheels for its mobilization, a housing of weather tight character mounted fixedly on said base frame structure, a horizontal partition wall in said housing setting off a compartment in its upper portion for a plurality of lengths of flexible air duct, an air passage formed in said housing below said partition wall and opening at its forward end through the forward end wall of said housing, a heat exchanger located in said passage near its forward end, louvers disposed in said forward end of the duct, an air cleaning filter back of said louvers; said heat exchanger setting off a plenum chamber rearwardly thereof, another chamber in said housing rearwardly of the plenum chamber, a suction blower unit contained therein and having an intake pipe extended into said plenum chamber, and a discharge spout directed therefrom toward the side of the housing and equipped to receive an extension duct, and said housing having an opening for the passage of a duct to said spout.

References Cited in the file of this patent
UNITED STATES PATENTS

| | | |
|---|---|---|
| 1,875,752 | Montero | Sept. 6, 1932 |
| 2,015,982 | Witzel | Oct. 1, 1935 |
| 2,151,140 | Novak | Mar. 21, 1939 |
| 2,244,172 | Novak | June 3, 1941 |
| 2,491,849 | Broome | Dec. 20, 1949 |
| 2,731,735 | Hartwig | Jan. 24, 1956 |